United States Patent
Mayville

(10) Patent No.: US 9,463,765 B1
(45) Date of Patent: *Oct. 11, 2016

(54) SECONDARY CHAMBER COMBUSTION CONTROL

(71) Applicant: TK Holdings Inc., Armada, MI (US)

(72) Inventor: Brian A. Mayville, Northville, MI (US)

(73) Assignee: TK Holdings Inc., Armada, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,910

(22) Filed: Feb. 24, 2014

Related U.S. Application Data

(62) Division of application No. 13/247,221, filed on Sep. 28, 2011, now Pat. No. 8,656,838.

(51) Int. Cl.
| | |
|---|---|
| *B60R 21/263* | (2011.01) |
| *B60R 21/264* | (2006.01) |
| *C06D 5/06* | (2006.01) |
| *C06D 5/00* | (2006.01) |
| *B60R 21/274* | (2011.01) |

(52) U.S. Cl.
CPC ........... *B60R 21/264* (2013.01); *B60R 21/263* (2013.01); *B60R 21/274* (2013.01); *C06D 5/00* (2013.01); *B60R 21/2644* (2013.01); *B60R 2021/2642* (2013.01); *B60R 2021/2648* (2013.01)

(58) Field of Classification Search
CPC ... B60R 21/26; B60R 21/263; B60R 21/264; B60R 21/2644; B60R 2021/2633; B60R 2012/2642; B60R 2021/2648; C06D 5/00; C06D 5/06

USPC ........ 102/530, 531; 280/736, 737, 741, 742, 280/728.1
See application file for complete search history.

(56) References Cited

U.S. PATENT DOCUMENTS

| | | | |
|---|---|---|---|
| 6,032,979 A | 3/2000 | Mossi et al. | |
| 6,189,927 B1 | 2/2001 | Mossi et al. | |
| 7,052,040 B2 * | 5/2006 | Matsuda et al. | 280/741 |
| 7,374,204 B2 | 5/2008 | Hoffman et al. | |
| 7,726,687 B2 | 6/2010 | Hoffman et al. | |
| 7,950,693 B2 * | 5/2011 | Jackson et al. | 280/741 |
| 8,011,303 B2 * | 9/2011 | Nakayasu et al. | 102/530 |
| 8,047,569 B2 * | 11/2011 | Cox et al. | 280/736 |
| 8,656,838 B1 | 2/2014 | Mayville | 102/530 |
| 8,820,783 B1 | 9/2014 | Thompson et al. | |
| 9,073,512 B1 * | 7/2015 | Mayville | |
| 2002/0144621 A1 | 10/2002 | McFarland et al. | |
| 2011/0221176 A1 * | 9/2011 | Bierwirth et al. | 280/741 |

* cited by examiner

*Primary Examiner* — James S Bergin
(74) *Attorney, Agent, or Firm* — L.C. Begin & Associates, PLLC

(57) ABSTRACT

A gas generating system includes a first chamber activatable to provide a first quantity of gas and a second chamber activatable independently of the first chamber to provide a second quantity of gas. A single opening enables fluid communication between the second chamber and the first chamber. A barrier seals the opening to prevent fluid communication between the first and second chambers prior to activation of the second chamber.

20 Claims, 5 Drawing Sheets

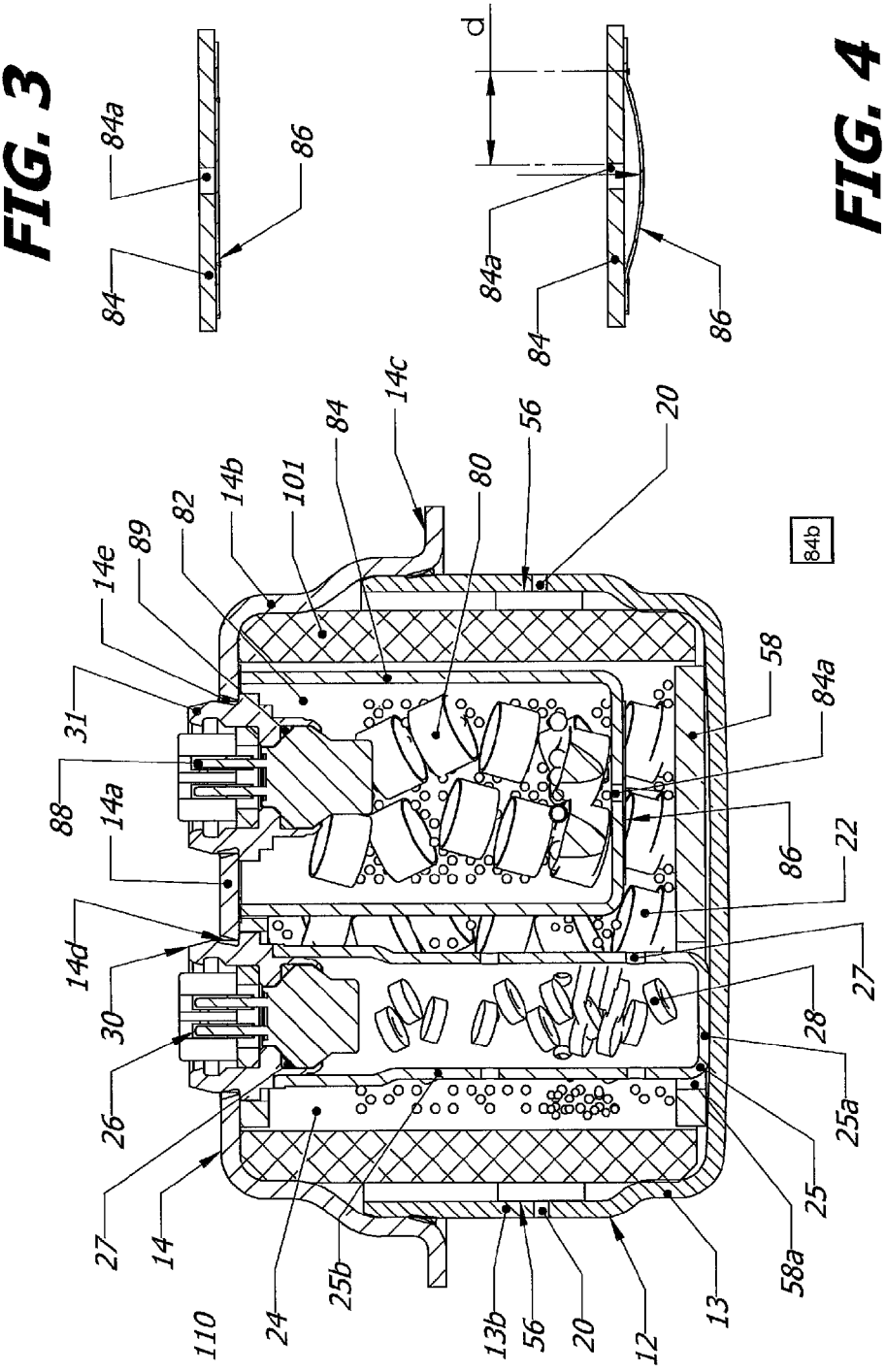

SECONDARY CHAMBER COMBUSTION CONTROL

CROSS REFERENCE TO RELATED APPLICATIONS

This application is a divisional of U.S. application Ser. No. 13/247,221, filed on Sep. 28, 2011, which claims the benefit of provisional application Ser. No. 61/387,378 filed on Sep. 28, 2010. These prior applications are incorporated herein by reference.

BACKGROUND OF THE INVENTION

The embodiments of the present invention relate to gas generating systems used to provide gases for gas-actuatable devices incorporated into, for example, a vehicle occupant protection system.

Gas generating systems may be provided with multiple chambers to allow the amount of inflation gas produced to be adjusted based on need. For example, a primary chamber may be activated or deployed based on an estimated need for a relatively smaller quantity of gas. An additional, optional secondary chamber may be independently activated or deployed based on an estimated need for a relatively greater quantity of gas. The secondary chamber may contain a gas generant material therein and may be activated after activation of the first chamber and release of at least a portion of the gas generated in the first chamber. After activation, the secondary chamber generates gas and may release the gas into the primary chamber through openings connecting the two chambers. The gas from the secondary chamber then exits the primary chamber into an associated gas-actuatable device.

In a situation where the secondary chamber is in fluid communication with the primary chamber during combustion of the secondary chamber gas generant material, the pressure within the secondary chamber may fall below a value conducive to efficient combustion of the material and/or below a value conducive to minimizing the generation of undesirable effluents, due to leakage of gases through the openings.

Therefore, a need exists for improved methods and/or mechanisms for controlling pressure within a secondary chamber in fluid communication with the first chamber, during combustion of a gas generant positioned within the second chamber.

SUMMARY OF THE INVENTION

In one aspect of the embodiments of the present invention, a gas generating system is provided including a first chamber activatable to provide a first quantity of gas and a second chamber activatable independently of the first chamber to provide a second quantity of gas. A single opening enables fluid communication between the second chamber and the first chamber. A barrier seals the opening to prevent fluid communication between the first and second chambers prior to activation of the second chamber.

In another aspect of the embodiments of the present invention, a gas generating system is provided including a first chamber activatable to provide a first quantity of gas, and a second chamber activatable independently of the first chamber to provide a second quantity of gas. A plurality of openings is formed along a flat portion of a surface defining a portion of the second chamber. The openings enable fluid communication between the second chamber and the first chamber. A barrier seals the opening to prevent fluid communication between the first and second chambers prior to activation of the second chamber.

BRIEF DESCRIPTION OF THE DRAWINGS

FIG. 2 is a cross-sectional side view of a gas generating system incorporating a combustion control mechanism in accordance with a second embodiment of the present invention.

FIG. 3 is a portion of the cross-sectional view shown in FIG. 2, showing a barrier in accordance with one embodiment of the present invention in an undeflected state.

FIG. 4 is the portion of the cross-sectional view shown in FIG. 3, showing the barrier in a deflected state after activation of the gas generating system and prior to rupture of the barrier.

DETAILED DESCRIPTION

Figure 1:
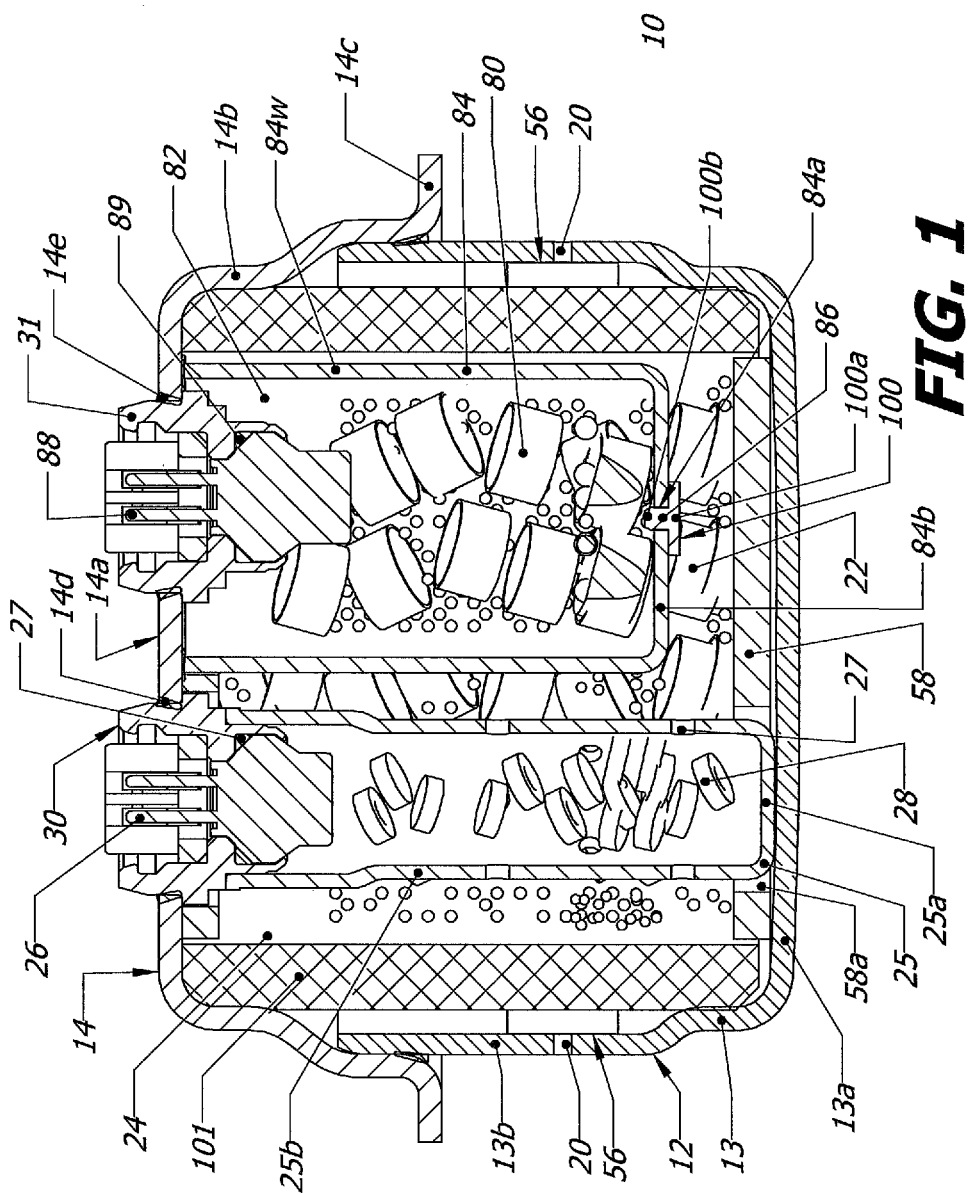
FIG. 1 is a cross-sectional side view of a gas generating system incorporating a combustion control mechanism in accordance with a first embodiment of the present invention.

Elements and features appearing in FIGS. 2-4 that are the same as corresponding elements shown in FIG. 1 have been given the same reference numerals.

FIGS. 1 and 2 show cross-sectional views of a gas generating system 10, 110 in accordance with embodiments of the present invention. In the embodiments shown, gas generating system 10, 100 is a dual-stage gas generating system including two separate, independently activatable chambers, a primary chamber 24 and an optional dependent or secondary chamber 82. Depending on the amount of gas required for a particular application, chamber 24 may be deployed alone, or chambers 24 and 82 may be deployed sequentially to inflate or otherwise actuate an associated gas-actuatable device. In another operational mode, both of chambers 24 and 82 are deployed simultaneously.

Gas generating system 10, 110 includes a generally cylindrical housing 12 having a first portion 13 and a second portion 14 attached to the first portion. First portion 13 includes a base portion 13a and a wall 13b extending from the base portion to define a first, primary chamber 24 suitable for receiving therein various components of the gas generating system. Second portion 14 includes a base portion 14a, a wall 14b extending from the base portion, and a flange 14c extending outwardly from wall 14b. Second portion 14 also has a pair of openings 14d and 14e formed therein to enable the mounting of initiators 26 and 88 in the housing for initiating combustion of gas generant materials positioned in the housing, as described below.

In the embodiments shown, a plurality of openings 20 are formed along first portion wall 13b to permit fluid communication between an interior of the housing and an associated airbag or other gas-actuatable device (not shown). Openings 20 may be covered with a foil or shim 56 formed from a material such as aluminum or stainless steel to prevent the incursion of water vapor into gas generating system housing 12 prior to activation of the system. In one embodiment, the foil 56 (sometimes referred to as "burst foil") is of a thickness in the range of about 0.01 to about 0.20 mm. The foil 56 may be adhered to an interior surface of the gas generating system housing through the use of an adhesive.

First and second housing portions 13 and 14 may be cast, stamped, extruded, molded or otherwise formed from a metallic material or other suitable material or materials.

First and second housing closures 30 and 31 are secured to housing second portion 14 within respective ones of openings 14d and 14e so as to form respective fluid-tight seals with the housing portion. First and second housing closures 30 and 31 may be crimped, welded, or otherwise secured within respective openings 14d and 14e of housing second portion 14. Closures 30 and 31 may be cast, stamped, or otherwise formed from a metallic material or any other suitable material or materials.

A first initiator 26 is secured within housing 12 so as to enable fluid communication with a booster material 28 (described below) after activation of the gas generating system. Ignition of booster material 28 ignites the gas generant 22. Initiator 26 is positioned and secured in first housing closure 30 using known methods, such that a fluid-tight seal is formed between the initiator 26 and the first housing closure. In the embodiment shown in FIGS. 1 and 2, an O-ring 27 is compressed between the initiator 26 and the first housing closure to form the seal. Initiator 26 may be formed as known in the art. One exemplary initiator construction is described in U.S. Pat. No. 6,009,809, herein incorporated by reference.

Referring again to FIGS. 1 and 2, a quantity of a known or suitable ignition or booster material 28, combustion of which ignites gas generant material 22, may be positioned within housing 12 so as to enable fluid communication between the booster material and gas generant composition 22 upon activation of the gas generating system.

In one embodiment, booster material 28 is a known auto-igniting booster material positioned in housing 12 so as to enable thermal communication with the housing after activation of the gas generating system, thereby enabling heat transfer from an exterior of the housing to the auto-igniting booster material using the housing as a heat transfer medium. Alternatively, the auto-igniting booster material may be positioned in housing 12 so as to enable thermal communication with an exterior of the housing after activation of the gas generating system, to enable heat transfer from the exterior of the housing to the auto-igniting booster material using a heat-transfer medium other than the housing. Ignition of the booster material results in ignition of the gas generant material 22, in a manner known in the art. In an embodiment using an auto-igniting booster material, the booster material is formulated to ignite when it reaches a temperature within a predetermined range. The auto-igniting booster material fulfills the functions of both a conventional booster material and a conventional auto-ignition material, enabling ignition of the gas generant material in cases where the housing 12 is exposed to an elevated external temperature resulting from, for example, a flame. This obviates the need for a separate auto-ignition material.

A cup 25 may be positioned within the gas generating system housing to enclose initiator 26 and to house booster material 28. Cup 25 includes a base portion 25a and one or more walls 25b extending from a periphery of base 25a to define, in conjunction with the base portion 25a, an interior of the cup. Wall(s) 25b terminate along edge(s) defining an open end of the cup. In the embodiment shown, the open end of the shell is attached along the edges to housing closure 30 using welds or any other suitable method or methods. Openings 27 are formed in wall(s) 25b to enable fluid communication between an interior of the cup and chamber 24 after activation of the gas generating system. This enables by-products of combustion of booster material 28 to reach the gas generant material 22. Activation of initiator 26 produces combustion of the booster material, thereby effecting ignition of gas generant composition 22 in a manner known in the art.

Cup 25 may be stamped, extruded, cast, or otherwise suitably formed and may be made from carbon steel, stainless steel, or any other suitable thermally conductive material. In an embodiment incorporating an auto-igniting booster material, cup base portion 25a may be configured to contact first housing portion 13, thereby facilitating transfer of heat from an exterior of housing 12 through base portion 13a and a cup base portion 25a to the auto-igniting booster material inside cup 25. This enables ignition of the auto-igniting booster material when the gas generating system is exposed to flames.

Gas generating system 10, 110 also includes a first inflation fluid source positioned within the outer wall for releasably storing, generating, or otherwise providing an inflation fluid for inflating an inflatable element (for example, an associated airbag) of a vehicle occupant protection system. In the embodiments shown in FIGS. 1 and 2, the first inflation fluid source comprises a gas generant material 22 positioned within chamber 24 formed in housing first portion 13.

Gas generant 22 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312 each incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. In some embodiments, the need for a filter may be eliminated by using a gas generant material having the above-described combustion characteristics.

Referring again to FIGS. 1 and 2, a cushion or pad 58 is positioned within chamber 24 proximate an end of housing first portion 13. Pad 58 aids in holding the gas generant material in place and/or in cushioning the gas generant against vibration and impact.

In order to facilitate heat transfer from the exterior of the housing 12 to an auto-igniting booster material positioned in cup 25, pad 58 may have an opening 58a formed therein to enable booster cup 25 to contact the first housing portion 13, thereby facilitating heat transfer from the exterior of the housing 12 to the auto-igniting booster material. Pad 58 may be formed from, for example, a ceramic fiber material or any other suitable material.

In the embodiments shown in FIGS. 1 and 2, gas generating system 10, 110 also includes a second inflation fluid source positioned within chamber 24 in fluid isolation from the first inflation fluid source. The second inflation fluid source is provided in order to supplement the inflation fluid provided by the first inflation fluid source in certain applications of the gas generating system, as described below.

In the embodiments shown in FIGS. 1 and 2, the second inflation fluid source comprises a second gas generant composition 80 positioned within a secondary combustion chamber 82 defined by a shell 84, housing portion 14, housing closure 31 and initiator 88. Thus, in the embodiment shown, chamber 82 is positioned within primary chamber 24. Second gas generant 80 is formulated so as to be ignitable responsive to activation of a second initiator 88 (described below). Similar to gas generant 22 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312, each incorporated by reference herein.

Second initiator 88 is secured within housing 12 so as to enable fluid communication with second gas generant 80 after activation of the second initiator. In the embodiment shown in FIGS. 1 and 2, second initiator 88 is positioned and secured within second housing closure 31 using known methods, such that a fluid-tight seal is formed between the initiator and the second housing closure. In the embodiment shown in FIGS. 1 and 2, an O-ring 89 is compressed between the initiator 88 and the first housing closure to form the seal. Activation of initiator 88 ignites the second gas generant 80. Initiator 88 may be formed as known in the art. One exemplary initiator construction is described in U.S. Pat. No. 6,009,809, herein incorporated by reference.

Shell 84 includes a base 84b and one or more walls 84w extending from a periphery of the base 84a to define an interior of the shell. Wall(s) 84w terminate along edge(s) defining an open end of the shell. The open end of the shell is attached along the edges to housing portion 14 using welds or any other suitable method or methods. Shell 84 may be formed from a metal, metal alloy, or other suitable material. Shell 84 may be attached to second housing portion 14 by welding or any other suitable method. Shell 84 includes one or more openings 84a configured to enable fluid communication between the interior of the shell and the exterior of the shell. Opening(s) 84a are sized and/or otherwise configured to throttle or impede, in a controlled and predetermined manner, the flow of gases from the interior of the shell to the shell exterior. That is, after the failure of a barrier 86, 100 (described below) positioned to seal opening(s) 84a prior to activation of the gas generating system, the flow of gases through opening(s) 84a is throttled so as to maintain the pressure within the shell 84 at a value within a range that facilitates efficient combustion of the second gas generant 80.

Opening(s) 84a are sized so that any increase in pressure that would result from continued combustion of the gas generant is offset or substantially offset by the loss of pressure due to gas flow through openings 84a. In this manner, the shell pressure is maintained at a value within the desired range for efficient combustion of second gas generant 80.

Figure 7:
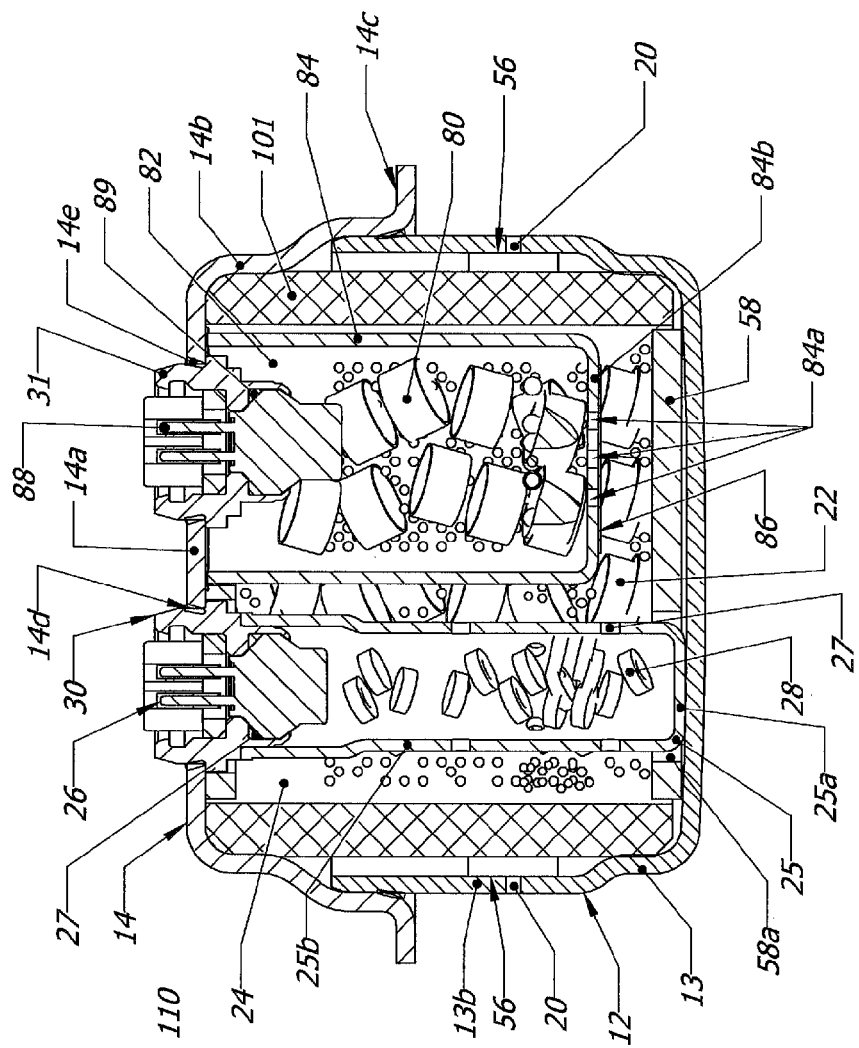
FIG. 7 is a cross-sectional side view of a gas generating system incorporating a combustion control mechanism in accordance with another embodiment of the present invention.

Referring to FIG. 7, in an alternative embodiment, multiple openings 84a are formed in shell base 84b to enable greater flexibility in controlling the pressure within chamber 82, and to enable the sizes of any barriers 86, 100 applied to seal the openings to be limited.

This desired pressure range for optimum combustion may be a range within which a self-sustaining combustion reaction in the gas generant will be maintained. In one particular embodiment, the desired pressure range has a lower limit of about 20 MPa.

In one particular application, the target pressure range for efficient combustion has a lower limit of 20 MPa and an upper limit which is determined based on the burst pressure of the structural components forming the second chamber, also incorporating a predetermined safety factor therein.

In other particular embodiments, the target pressure range for efficient combustion has a lower limit of 20 MPa and an upper limit of between 50 MPa and 90 MPa, depending again on the structure of the second chamber and the desired safety factor.

In one particular embodiment, the target pressure range for efficient combustion has a lower limit of 20 MPa and an upper limit of 60 MPa.

The size(s) and number of shell opening(s) 84a may also be specified according to the requirements of a particular application, so as to throttle gas flow from chamber 82 to chamber 24 such that a pressure greater than 20 MPa is maintained within chamber 82 for a time period sufficient to permit full combustion off gas generant material 80 when the pressure within chamber 24 is at or about ambient atmospheric pressure (i.e., after most or all of the gas generated in chamber 24 has exited the chamber through openings 20).

In this embodiment, the rate of gas flow from the second chamber is throttled so as to maintain the pressure within second chamber 84 within a range suitable for efficient combustion of the second gas generant material 80, for as much of the combustion process as possible. This facilitates efficient combustion of the second gas generant material 80 after first gas generant material 22 has combusted and the resultant generated gases have exited housing 12, at which point the pressure within chamber 24 (and thus, the back pressure acting on a gas exiting shell opening(s) 84a is at or close to ambient atmospheric pressure. This condition may occur, for example, in an operational mode where the second chamber 82 is activated after activation of the first chamber 24.

In particular embodiments, shell base 84b is flat (within the limits of applicable manufacturing tolerances).

In particular embodiments, a single opening 84a is provided in shell 84 for regulating combustion of second gas generant 80. In particular embodiments, the single opening 84a is formed in an embodiment of shell 84 in which base portion 84b is flat, as previously described.

In the manner described above, appropriate sizing of the opening(s) 84a enables the pressure in the shell to be regulated to affect combustion efficiency within the shell regardless of the pressure in the main housing chamber 24. Factors affecting the total area (or areas) of opening(s) needed to provide the effect described above include the total mass of gas generant material to be combusted in the shell, the type of gas generant, the composition of the gas generant, the total surface area of the gas generant material to be combusted in the shell, and other pertinent factors.

It will be appreciated that design considerations such as the total mass of gas generant material to be combusted in the shell, the composition of the gas generant, the total surface area of the gas generant material to be combusted in the shell, and other parameters may be iteratively harmonized to provide a total area of shell opening(s) 84a which impedes gas flow from the shell to the extent necessary to provide conditions within the shell which facilitate efficient combustion of the second gas generant. When properly informed with system performance requirements and data (typically developed in gas generating system design and manufacture) relating to the interactions between these and other design considerations, the actual dimensions of the opening(s) 84a for any particular application may be iteratively or otherwise determined to result in a system that provides efficient combustion of the second gas generant 80. Thus, the dimensions of the opening(s) 84a and the effects of other design variables may be either singularly or jointly evaluated on a trial and error basis for their effects on performance characteristics of the gas generating system. Given information relating to these factors, the total area (or areas) of opening(s) needed to provide the throttling effect described can be determined and provided.

Barrier 86, 100 also acts to fluidly isolate second gas generant 80 from first gas generant 22. Barrier 86 is configured to prevent sympathetic ignition of second gas generant 80 in response to combustion of first gas generant 22, by preventing flame and combustion products from combustion of the first gas generant from reaching the second gas generant. Thus, barrier 86, 100 is configured so as not to rupture or fail under elevated pressure and/or temperature in chamber 24 resulting from combustion of gas generant 22.

Barrier 86, 100 also blocks the flow of gases through the opening(s) 84a while shell internal pressure increases during combustion of second gas generant 80. Barrier 86, 100 may be configured to fail at a point after activation of second initiator 88 when the internal pressure in shell 84 has reached a value within the range desired for efficient combustion, and when the pressure differential between chamber 24 and chamber 82 is at a value within a predetermined range. Thus, barrier 86, 100 enables a build-up of internal pressure within chamber 84 to facilitate efficient combustion prior to failure of the barrier 86, 100.

In one particular embodiment, the barrier is configured to fail when the pressure within the interior of chamber 24 is within a range centered about ambient atmospheric pressure and the internal pressure within chamber 82 is at a value within a range determined to promote efficient combustion of the gas generant 80 in the second chamber. As described previously, opening(s) 84a is configured to maintain the pressure within chamber 82 within the range for optimum combustion of gas generant 80 for as much of the combustion operation as possible.

Barrier 86, 100 is positioned so as to block fluid communication between chamber 24 and the chamber 82 (i.e., interior of shell 84, which is positioned within chamber 24). The barrier 86, 100 is configured to block such fluid communication until the barrier is pierced, removed, or otherwise perforated or destroyed by products of combustion of second gas generant 80. This permits release of inflation gas from shell 84 into chamber 24, then out of the housing 12 via gas exit openings 20 into an associated inflatable device. Barrier 86, 100 may be formed from any suitable material, such as a metal, metal alloy, polymer, or other suitable material.

The barrier is considered to have failed when it no longer performs the function of blocking fluid communication between chamber 24 and the interior of shell 84. The actual pressure range at which the barrier fails may depend on the requirements of a particular application. Sealed by barrier 86, 100 and by the attachment of the shell to second housing portion 31, the interior of the shell 84 serves as a combustion chamber for second gas generant 80, as previously described.

Referring to FIG. 1, in one particular embodiment, the barrier is in the form of a plug 100 having a base 100a and a projection 100b extending from the base and insertable into opening 84a formed in shell 84. Plug 100 may be attached to shell 84 by welding, adhesive application, or any other suitable means. Plug base 100a is configured to prevent plug 100 from being pushed into the interior of shell 84 by the elevated pressure generated in chamber 24 during combustion of gas generant 22. In one embodiment, plug projection 100b is configured to be retained within opening 84a using an interference fit. In other embodiments, the plug projection may be retained within opening 84a using another method. Plug 100 fails as a barrier when it is pushed out of opening 84a, when a pressure differential between chambers 24 and 82 reaches a value within a predetermined range. Plug 100 may be formed from any suitable material using any suitable process.

In another particular embodiment (shown in FIG. 2), barrier 86 is in the form of a shim or strip welded or otherwise suitably attached to an exterior surface of shell 84. As seen in FIGS. 2-4, this embodiment of the barrier is configured to overlap the opening 84a to enable a certain spacing d to be provided between the opening and the actual shell-barrier attachment. This enables pressurized gases in the shell to flow through opening 84a and between the barrier and the shell. The elevated pressure from the gases produces a stretching and then a failure (through rupture or fracture) of the barrier, permitting gases to flow into chamber 24 and out of housing 12 through openings 20.

In addition to the structures described above, the barrier or barriers used to seal the openings enabling fluid communication between chambers 24 and 82 may have any of a variety of alternative structures and may use any of a variety of alternative securement methods, provided the structure and securement methods used may be tailored to produce a seal meeting the performance requirements of the particular application.

Referring again to FIGS. 1 and 2, a filter 101 formed from a suitable material (such as wire mesh, for example) may be provided for filtering particulates from the generated gases and/or for cooling the gases. The filter is positioned along a flow path of gases from chambers 24 and 82 to openings 20 so that generated gases are forced to pass through the filter prior to exiting the housing.

Operation of the embodiments of the gas generating system will now be discussed with reference to FIGS. 1 and 2.

The gas generating system may be operatively coupled to a crash sensor (not shown) used for detecting the occurrence and severity of a crash event. If the sensor determines that the severity of the crash is above some first predetermined threshold level, the crash sensor may convey an activation signal to initiator 26, thereby activating booster propellant 28 in first chamber 24. By-products resulting from combustion of booster material 28 flow through booster cup openings 27, igniting gas generant 22. The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

The severity of the crash that is detected by the sensor will determine how the airbag or other gas-actuatable device is actuated. Specifically, if the severity of the crash is only above the first threshold level, then only the first chamber 24 will be activated (as just described) to provide gas to actuate the gas-actuatable device. However, if the severity of the crash is determined to be above the second threshold level, then both the first chamber 24 and the second chamber 82 will be activated to provide gas to actuate the gas-actuatable device. A signal from the crash sensor is then conveyed to second initiator 88, thereby activating second initiator 88 and igniting second gas generant 80. Combustion of the second gas generant is regulated as previously described.

Inflation gas produced by combustion of the second gas generant 80 proceeds out through opening(s) 84a, then through openings 20 in housing 12 into an associated airbag or other gas-actuatable device. Efficient combustion of the supplemental gas generant 80 is facilitated by appropriately configuring the shell opening(s) 84a, as previously described.

In an operational mode where both of chambers 24 and 82 are deployed simultaneously, the crash sensor conveys simultaneous activation signals to initiator 26 and to initiator 88, thereby activating booster propellant 28 in first chamber 24 and second gas generant 80. By-products resulting from combustion of booster material 28 flow through booster cup openings 27, igniting gas generant 22. This mode provides simultaneous or overlapping combustion of gas generants 22 and 80.

The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

Initially, prior to the escape of a quantity of generated gases from chamber 24 through openings 20, the pressure differential between combusting chamber 24 and combusting chamber 82 will be insufficient to produce failure of the barrier (i.e., either plug 100 or shim 86 in the embodiments previously described) preventing fluid communication between the chambers. When the pressure in first chamber 24 falls below a predetermined value due to egress of generated gas, a pressure differential will be created between chambers 24 and 82 sufficient to produce failure of the barrier, in a manner previously described. After failure of the barrier, gases generated by combustion of gas generant 80 flow out of chamber 82 through opening 84, into chamber 24, and out of chamber 24 through openings 20 as previously described.

Figure 5:
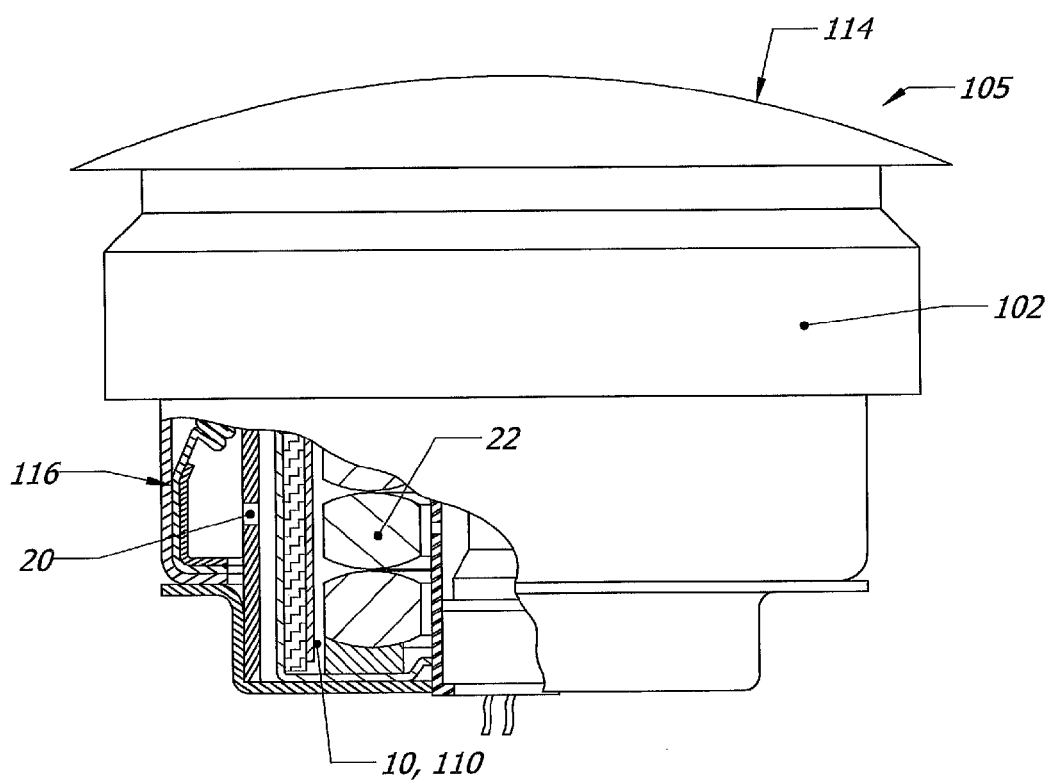
FIG. 5 is a partial cross-sectional side view of an airbag module employing a gas generating system including a combustion control mechanism in accordance with an embodiment of the present invention.

FIG. 5 shows a particular application of a gas generating system incorporating a combustion control mechanism in accordance with one of the embodiments described above. Referring to FIG. 5, the gas generating system 10, 110 may be incorporated into a driver side airbag module 105. Airbag module 105 comprises a module housing 102 having a rupturable frontal closure 114, an airbag 116, and a gas generating system 10, 110 in accordance with one of the embodiments previously described. An exemplary gas generating system construction suitable for use in airbag module 105 is described in U.S. Pat. No. 6,422,601, incorporated herein by reference. As described above, gas generating system housing 12 contains openings 20 and 20' (not shown) in fluid communication with an interior of airbag 116, for effecting discharge of gas produced by gas generants 22 and 80 (not shown).

Figure 6:
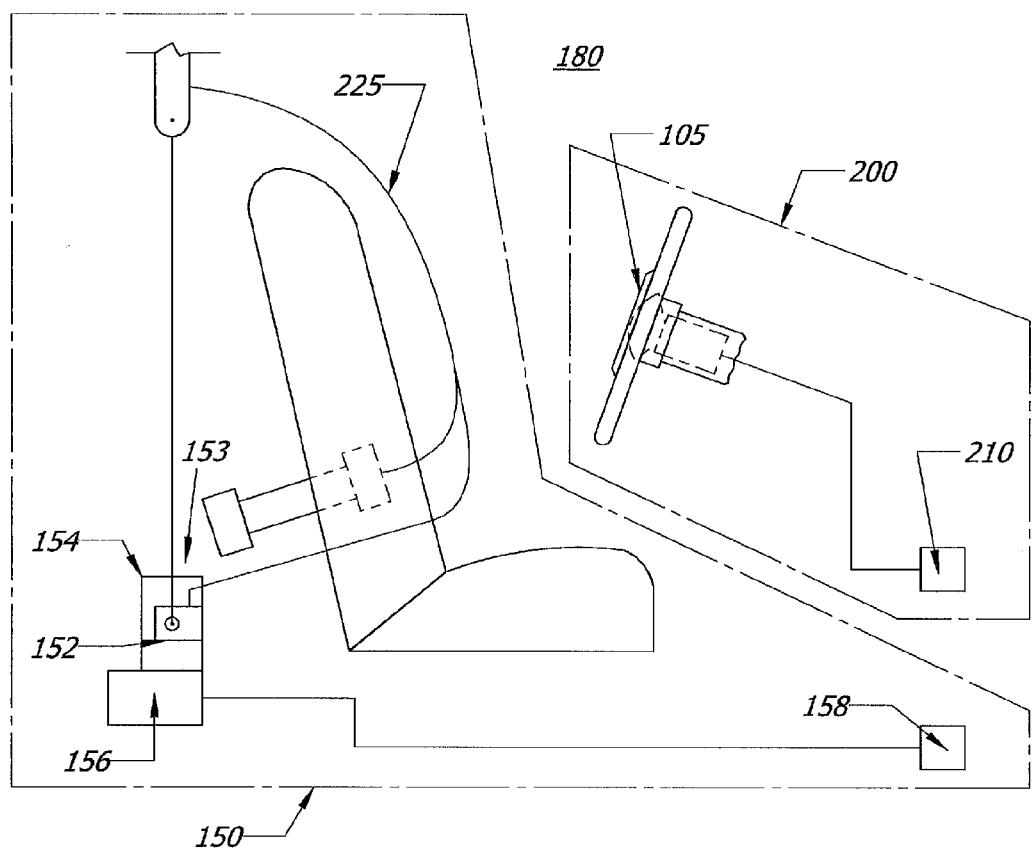
FIG. 6 is a schematic representation of an exemplary vehicle occupant protection system incorporating a combustion control mechanism in accordance with an embodiment of the present invention.

Referring now to FIG. 6, airbag module 105 or any of the gas generating system embodiments described above may be incorporated into a broader, more comprehensive vehicle occupant protection system 180 including additional elements such as, for example, a safety belt assembly 150. FIG. 6 shows a schematic diagram of one exemplary embodiment of such a protection system. Airbag module 105 may be in communication with a crash event sensor 210 which is in communication with a known crash sensor algorithm that signals actuation of airbag module 105 via, for example, activation of initiators 26 and 88 (FIGS. 1 and 2) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic initiator (not shown) incorporated into the pretensioner. U.S. Pat. Nos. 6,505,790 and 6,419,177, previously incorporated herein by reference, provide illustrative examples of pretensioners actuated in such a manner.

Other inflation fluid sources are also contemplated for use in the present invention. For example, in an alternative embodiment (not shown), housing 12 may be configured to contain a pressurized gas in the portion of the housing interior which is exterior of shell 85 and cup 25. This gas may be released by rupturing shims 56 in any suitable manner. Alternatively, a vessel containing a pressurized gas may be positioned within housing 12 for use as the first inflation fluid source.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A gas generating system comprising:
   a first chamber activatable to provide a first quantity of gas;
   a shell positioned within the first chamber and defining a second chamber activatable independently of the first chamber to provide a second quantity of gas;
   a single opening enabling fluid communication between the second chamber and the first chamber; and
   a barrier sealing the opening to prevent fluid communication between the first and second chambers prior to activation of the second chamber, the barrier being configured to enable pressurized gases to flow from the second chamber through opening and between the barrier and the shell prior to a failure of the barrier.

2. The gas generating system of claim 1 wherein the barrier comprises a plug having a base and a projection extending from the base and configured for insertion into the opening.

3. The gas generating system of claim 2 wherein the plug projection extends into the opening.

4. The gas generating system of claim 1 wherein the plug projection is configured to be forced out of the opening responsive to the occurrence of a pressure differential within a predetermined range, between a pressure in the first chamber and a pressure within the second chamber.

5. The gas generating system of claim 4 wherein the plug is coupled to the opening so as to be unattached to any other portion of the gas generating system after the plug is forced out of the opening.

6. An airbag system including a gas generating system in accordance with claim 1.

7. A vehicle occupant protection system including a gas generating system in accordance with claim 1.

8. A gas generating system comprising:
   a housing;
   a first chamber within the housing and structured to be activatable to provide a first quantity of gas;
   a shell including a flat base and a wall extending from a periphery of the base so as to define a second chamber positioned within the first chamber and structured to be activatable independently of the first chamber to provide a second quantity of gas;
   a single opening formed along the base and enabling fluid communication between the second chamber and the first chamber; and
   a barrier sealing the opening to prevent fluid communication between the first and second chambers prior to activation of the second chamber.

9. An airbag system including a gas generating system in accordance with claim 8.

10. A vehicle occupant protection system including a gas generating system in accordance with claim 8.

11. The gas generating system of claim 8 wherein the opening is sized such that a pressure within a range having a lower limit of about 20 MPa is maintained in the second chamber after failure of the barrier for at least a predetermined time period after a start of combustion of a gas generant material positioned in the second chamber.

12. The gas generating system of claim 11 wherein the pressure range has an upper limit of between 50 MPa and 90 MPa.

13. The gas generating system of claim 12 wherein the pressure range has an upper limit of 60 MPa.

14. The gas generating system of claim 11 wherein the opening is sized such that a pressure within the range is maintained in the second chamber after failure of the barrier for at least the predetermined time period after failure of the barrier, when a pressure acting on an exterior of the second chamber is at or about ambient atmospheric pressure.

15. The gas generating system of claim 11 wherein the barrier is structured to fail when a pressure differential between an interior of the second chamber and an exterior of the second chamber reaches a value of about 20 MPa.

16. The gas generating system of claim 8 further comprising
   a quantity of gas generant material positioned in the second chamber, and
   wherein the single opening is sized so as to enable a pressure within a range having a lower limit of about 20 MPa to be maintained in the second chamber after failure of the barrier for at least a predetermined time period after a start of combustion of the gas generant material.

17. The gas generating system of claim 16 wherein the pressure range has an upper limit of between 50 MPa and 90 MPa.

18. The gas generating system of claim 16 wherein the pressure range has an upper limit of 60 MPa.

19. An airbag system including a gas generating system in accordance with claim 16.

20. A vehicle occupant protection system including a gas generating system in accordance with claim 16.

* * * * *